US011624875B2

(12) United States Patent
Ho et al.

(10) Patent No.: US 11,624,875 B2
(45) Date of Patent: Apr. 11, 2023

(54) FIBER OPTIC CONNECTOR WITH DUST SHUTTER AND ORIENTING GUIDE

(71) Applicant: Senko Advanced Components, Inc., Marlborough, MA (US)

(72) Inventors: Man Ming Ho, Kowloon (HK); Kazuyoshi Takano, Tokyo (JP); Kenji Iizumi, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/171,835

(22) Filed: Feb. 9, 2021

(65) Prior Publication Data

US 2021/0247572 A1     Aug. 12, 2021

Related U.S. Application Data

(60) Provisional application No. 62/972,598, filed on Feb. 10, 2020.

(51) Int. Cl.
*G02B 6/36*     (2006.01)
*G02B 6/38*     (2006.01)

(52) U.S. Cl.
CPC ......... *G02B 6/3825* (2013.01); *G02B 6/3849* (2013.01); *G02B 6/3874* (2013.01); *G02B 6/3897* (2013.01)

(58) Field of Classification Search
CPC .. G02B 6/3825; G02B 6/3849; G02B 6/3874; G02B 6/3897; G02B 6/3893; G02B 6/00
See application file for complete search history.

(56) References Cited

U.S. PATENT DOCUMENTS

| | | | |
|---|---|---|---|
| 5,506,922 | A | 4/1996 | Grois et al. |
| 5,828,804 | A | 10/1998 | Akins et al. |
| 6,685,362 | B2 | 2/2004 | Burkholder et al. |
| 6,994,476 | B1 | 2/2006 | Yang |
| 7,785,018 | B2 | 8/2010 | Jones et al. |

(Continued)

FOREIGN PATENT DOCUMENTS

| | | |
|---|---|---|
| WO | 2017116933 A2 | 7/2017 |
| WO | 2018044728 A1 | 3/2018 |

OTHER PUBLICATIONS

International Search Report and Written Opinion, Application No. PCT/US19/69138, dated Mar. 4, 2020, pp. 9.

(Continued)

*Primary Examiner* — Jennifer Doan

(57) ABSTRACT

A fiber optic adapter for mating with a fiber optic connector includes an adapter housing. The adapter housing includes a wall and an opening that accepts the fiber optic connector. An optical alignment axis extends through the adapter housing and passes through the opening of the adapter housing. A guide is disposed on the wall of the outer housing. The guide comprises a cam surface located inward of the opening, facing toward the opening, and extending along an axis that is transverse to the optical alignment axis. The cam surface is arranged for engaging the fiber optic connector inserted into the opening along an insertion axis that is divergent from the optical alignment axis to drive the fiber optic connector substantially into alignment with the optical alignment axis as the fiber optic connector traverses the cam surface upon being pushed farther into the adapter housing.

20 Claims, 11 Drawing Sheets

(56) References Cited

U.S. PATENT DOCUMENTS

| | | |
|---|---|---|
| 7,837,395 B2 | 11/2010 | Lin et al. |
| 8,727,636 B2 | 5/2014 | Isenhour et al. |
| 8,807,845 B2 | 8/2014 | Lin |
| 10,502,903 B1 | 12/2019 | Wang et al. |
| 2005/0213892 A1* | 9/2005 | Barnes ................ G02B 6/3846 385/60 |
| 2015/0078710 A1 | 3/2015 | Sato |
| 2019/0271816 A1* | 9/2019 | Wong ................... G02B 6/3869 |

OTHER PUBLICATIONS

International Search Report and Written Opinion, Application No. PCT/US21/17315, dated Apr. 27, 2021, pp. 10.

* cited by examiner

FIBER OPTIC CONNECTOR WITH DUST SHUTTER AND ORIENTING GUIDE

CROSS-REFERENCE TO RELATED APPLICATION

This application claims priority to U.S. Provisional App. No. 62/972,598, filed Feb. 10, 2020, the entirety of which is hereby incorporated by reference.

FIELD

The present disclosure generally relates to fiber optic connections, and, more specifically, to a fiber optic adapter.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds. Fiber optic connectors need to be able to be installed rapidly, while assuring that the connections do not produce undue loss, and do not damage to the connectors.

SUMMARY

In one aspect, a fiber optic adapter for mating with a fiber optic connector having an outer housing comprises an adapter housing including a wall and an opening configured to accept the fiber optic connector outer housing. An optical alignment axis extends through the adapter housing and passes through the opening of the adapter housing. A guide is on the wall of the outer housing. The guide comprises a cam surface located inward of the adapter housing opening, facing toward the adapter housing opening and extending along an axis that is transverse to the optical alignment axis. The cam surface is configured and arranged in the adapter housing for engaging the fiber optic connector outer housing inserted into the adapter housing opening along an insertion axis that is divergent from the optical alignment axis to drive the fiber optic connector substantially into alignment with the optical alignment axis as the fiber optic connector traverses the cam surface upon being pushed farther into the adapter housing.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
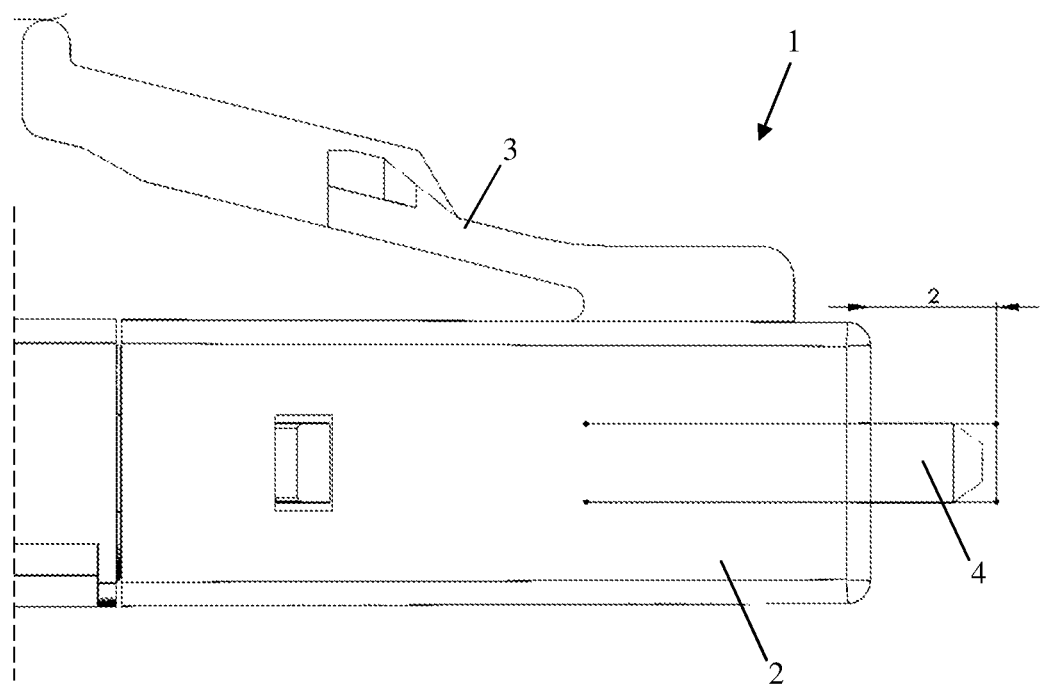
FIG. 1 is a fragmentary side view of a fiber optic connector.

Referring to FIG. 1, an example fiber optic connector 1 (broadly, a fiber optic device) is generally indicated at 1. As generally known in the art, the fiber optic connector 1 is attached to end of a fiber optic cable (not shown) for connecting the one or more optical fibers (not shown) of the fiber optic cable to a fiber optic device. The fiber optic connector 1 includes an outer housing 2 (e.g., fiber optic connector outer housing), a latch 3 for securing the fiber optic connector to another fiber optic device (e.g., a fiber optic adapter), and a ferrule 4 for forming an optical connection with the fiber optic device. Other configurations of the fiber optic connector 1 are within the scope of the present disclosure.

Figure 2:
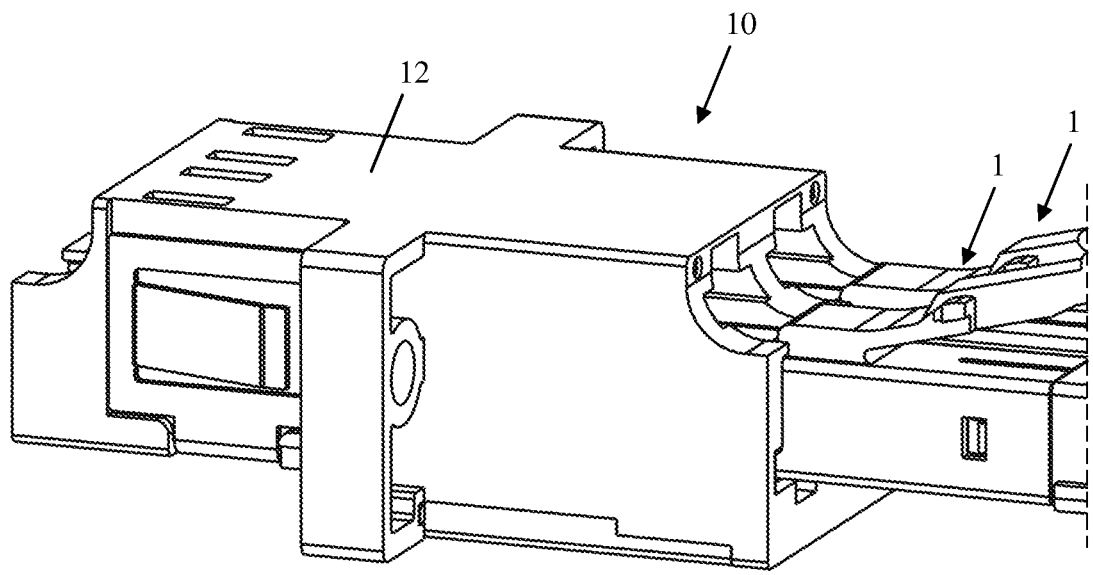
FIG. 2 is a fragmentary perspective of two fiber optic connectors being inserted into a fiber optic adapter according to the present disclosure.
Figure 3:
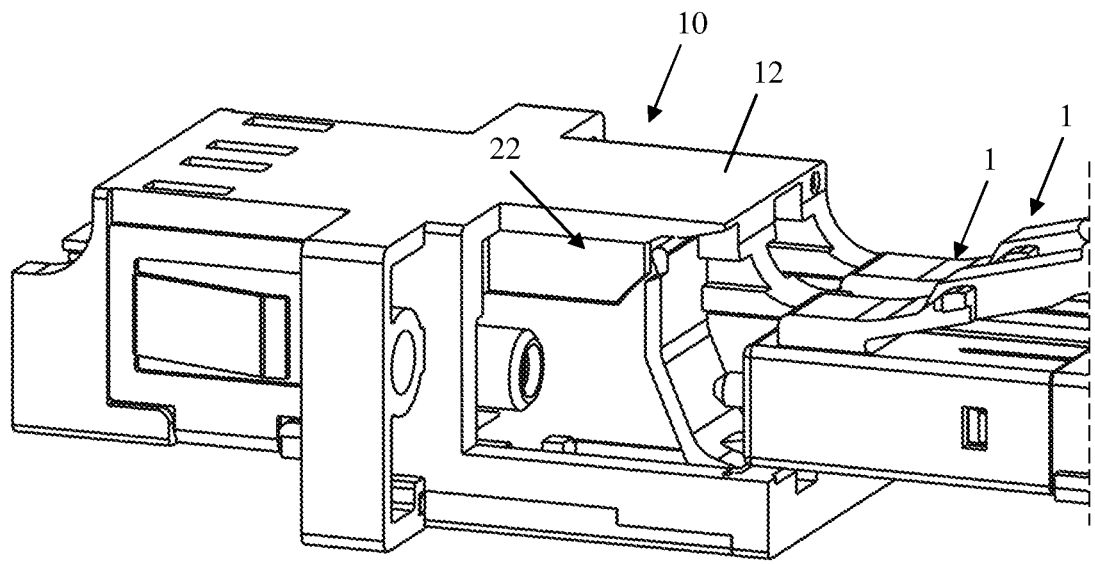
FIG. 3 is similar to FIG. 2, with portions of the fiber optic adapter cut away to reveal interior details.

Referring to FIGS. 2 and 3, a fiber optic adapter (broadly, a fiber optic device) according to one embodiment of the present disclosure is generally indicated at reference numeral 10. The fiber optic adapter 10 is configured for mating connection with one or more fiber optic devices such as the fiber optic connector 1. For example, the fiber optic adapter 10 can mate the fiber optic connector 1 with another fiber optic device (not shown), such as another fiber optic connector. The fiber optic adapter 10 is used to form a fiber optic connection between the fiber optic devices. When the fiber optic adapter 10 is connected to the other fiber optic devices, an optical connection (e.g., a fiber optic connection) is formed that enables communication between different fiber optic components (e.g., cables, devices, etc.) in an optical communications network. Other configurations of the fiber optic adapter 10 are within the scope of the present disclosure. For example, the adapter could make electrical or other types of connections instead of or in addition to an optical connection. As used herein and for illustrative purposes, the fiber optic connector 1 will be the example fiber optic device with which the fiber optic adapter 10 connects.

The adapter 10 is constructed to receive and attach to two fiber optic connectors 1 at one end thereof. For the purposes of this description, the structures, components and features of the adapter 10 are generally the same for each fiber optic connector 1. Accordingly, the structure, components and features of the adapter 10 are described herein in relation to one fiber optic connector with the understanding these structures, components and features of the adapter are generally duplicated for each additional fiber optic connector 1 that the adapter is configured to connect to. Accordingly, the adapter 10 can be configured to connect to more or fewer fiber optic connectors 1, such as one, three, four, etc. fiber optic connectors.

Referring to FIGS. 2-6, the adapter 10 includes an adapter housing 12. The adapter housing 12 includes walls, such as exterior walls (not separately identified). The adapter housing 12 may also include one or more interior walls 14, which generally separate adjacent fiber optic connectors 1 connected to the adapter 10. In a single connection configuration (not shown) where the adapter 10 is configured to connect to only one fiber optic connector 1, the adapter housing 12 may not include an interior wall. In other embodiments, the interior wall may be removed or have an opening in it so that the wall does not separate cavities 18 that receive respective fiber optic connectors 1. The adapter housing 12 includes an opening 16 (e.g., adapter housing opening) configured to accept the fiber optic connector 1 (specifically, the outer housing 2 of the fiber optic connector). The adapter housing 12 includes a cavity 18 in communication with the opening 16 which is sized and shaped to receive the fiber optic connector 1. The adapter 10 includes an optical alignment axis OAA that extends through the adapter housing 12. The optical alignment axis OAA passes through the opening 16 of the adapter housing 12. The optical alignment axis OAA also passes through the cavity 18 of the adapter housing 12. The adapter 10 includes an alignment sleeve 20 in the interior of the adapter housing 12 (e.g., in the cavity 18). The alignment sleeve 20 is configured to receive the ferrule 4 of the fiber optic connector 1, when the connector is inserted into the adapter 10 to form (e.g., facilitate the formation of) the optical connection. The alignment sleeve 20 is co-axial with the optical alignment axis OAA.

Figure 17:
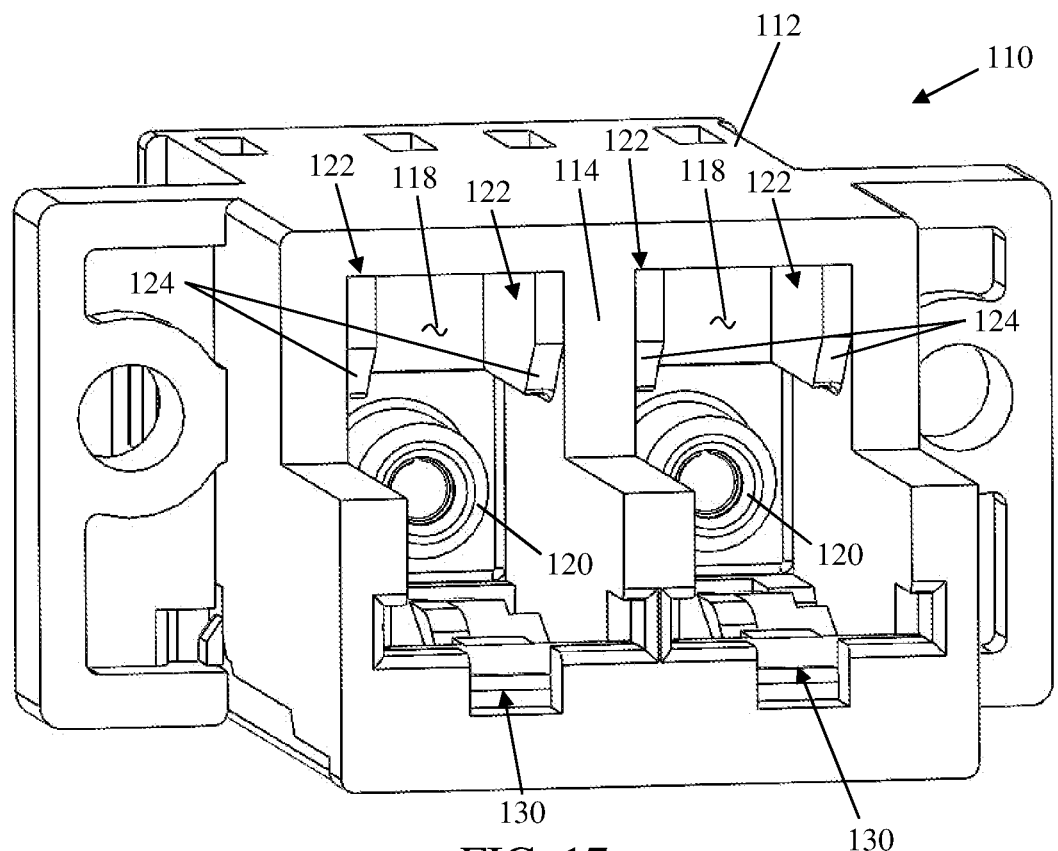
FIG. 17 is a perspective of the fiber optic adapter of FIG. 16, with dust shutters in the open position and portions of the adapter cut away to reveal interior details.
Figure 18:
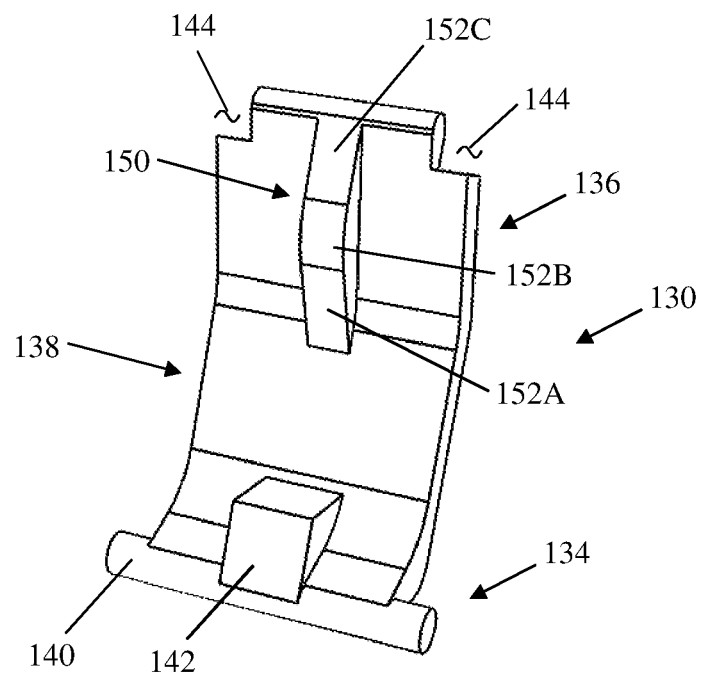
FIG. 18 is a perspective of the dust shutter of the fiber optic adapter of FIG. 16.

The adapter 10 includes one or more guides 22 (e.g., one or more first guides). The guides 22 position the fiber optic connector 1 within the adapter housing 12. The guides 22 are configured to align the fiber optic connector 1 with the optical alignment axis OAA of the adapter housing 12 as the fiber optic connector is inserted into the adapter 10. Specifically, the guides 22 are configured to align the ferrule 4 of the fiber optic connector 1 with the alignment sleeve 20 of the adapter 10, just prior to engagement of the ferrule 4 with the alignment sleeve. In addition, the guides 22 can be configured to hold the fiber optic connector 1 in alignment with the optical alignment axis OAA. The connection between the fiber optic connector 1 and the adapter 10 can result in insertion losses and/or the connector becoming jammed in the adapter due to misalignment. Aligning the fiber optic connector 1 with the guides 22 as the connector is inserted into adapter 10 minimizes insertion losses and prevents jamming. In addition, aligning the ferrule 4 of the fiber optic connector 1 with the alignment sleeve 20 before the ferrule reaches the alignments sleeve prevents the ferrule from engaging an edge of the alignment sleeve, which could damage the ferrule thereby impairing the optical connection. In the illustrated embodiment, the adapter 10 includes two guides 22 on either side of the cavity 18 (see FIG. 17), although more or fewer guides are within the scope of the present disclosure. Thus, the two guides 22 engage opposite sides of (e.g., different portions of) the outer housing 2 of the fiber optic connector 1. The two guides 22 are generally identical (e.g., are mirror images of each other). Accordingly, one guide 22 will now be described with the understanding the description also generally applies to the other guide.

The guide 22 is on one of the walls of the outer housing 12. In the illustrated embodiment shown in FIGS. 4 and 5, the guide 22 is on the interior wall 14. The guide 22 generally extends from adjacent a top wall of the outer housing 12 downward into the cavity 18. The guide 22 is arranged such that when the fiber optic connector 1 is inserted into the adapter 10, the connector may engage the guide if the connector is misaligned with the optical alignment axis OAA. The guide 22 comprises a cam surface 24. The cam surface 24 is located inward of the opening 16. The cam surface 24 faces toward the opening 16. The cam surface 24 extends along an axis that is transverse to the optical alignment axis OAA. In other words, the cam surface 24 extends at an angle to the optical alignment axis OAA. In one embodiment, the cam surface 24 is disposed at about a 45-degree angle to the optical alignment axis OAA.

The cam surface 24 is configured and arranged in the adapter housing 12 (e.g., the cavity 18) for engaging the fiber optic connector 1 (e.g., the outer housing 2) as the connector is inserted into and pushed farther into the adapter 10. Specifically, the cam surface 24 is configured and arranged to engage the outer housing 2 of the fiber optic connector 1 inserted into the opening 16 (and cavity 18) along an insertion axis IA (e.g., a first insertion axis) that is divergent from the optical alignment axis OAA to drive the fiber optic connector 1 substantially into alignment with the optical alignment axis as the fiber optic connector traverses the cam surface upon being pushed farther into the adapter housing. In particular, the cam surface 24 is positioned and arranged to engage the outer housing 2 of the fiber optic connector 1 when the fiber optic connector is inserted along an upwardly extending insertion axis IA (FIG. 7) (e.g., when the connector is inserted along or at an upward angle) to drive the fiber optic connector downward (e.g., push or rotate the front end of the connector downward) substantially into alignment with the optical alignment axis OAA as the fiber optic connector traverses the cam surface (and traverses within the cavity 18, further into the adapter 10) upon being pushed farther into the adapter housing 12. As the cam surface 24 pushes the front or leading end of the fiber optic connector 1 downward, the connector may rotate about a portion of the adapter housing 12 adjacent the opening 16 to bring the insertion axis IA (e.g., the direction of movement) into substantial alignment with the optical alignment axis OAA.

Figure 4:
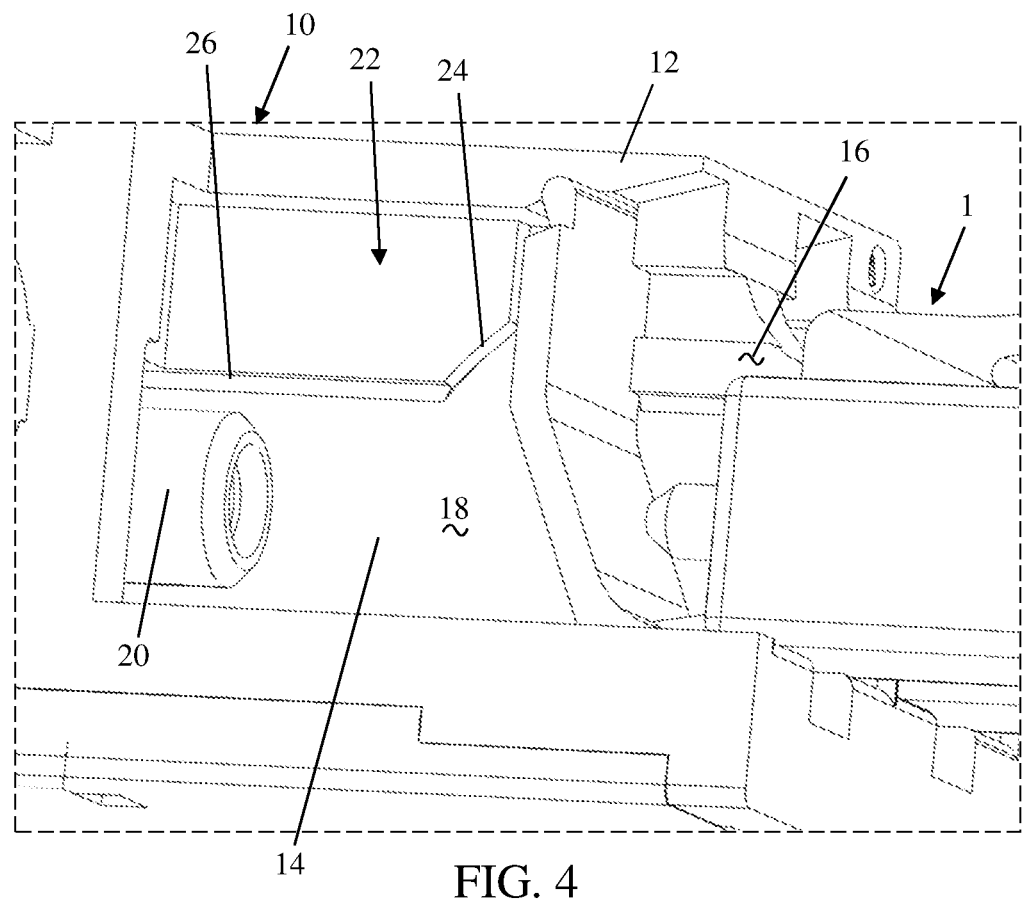
FIG. 4 is an enlarged fragment of FIG. 3.
Figure 5:
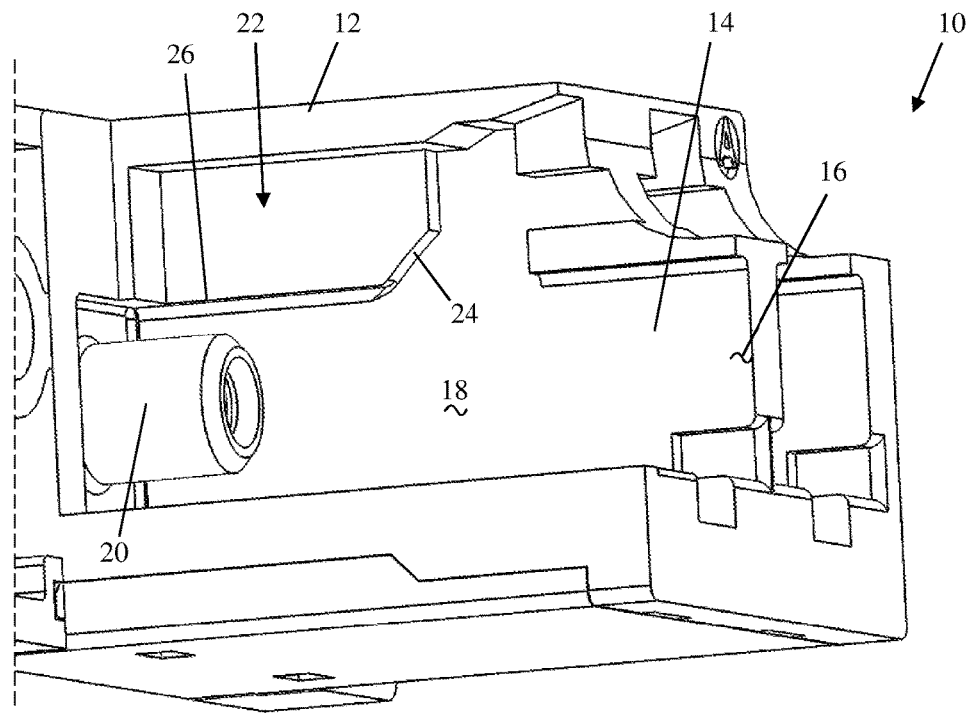
FIG. 5 is an enlarged, fragmentary perspective of the fiber optic adapter, with portions of the fiber optic adapter cut away to reveal interior details.
Figure 6:
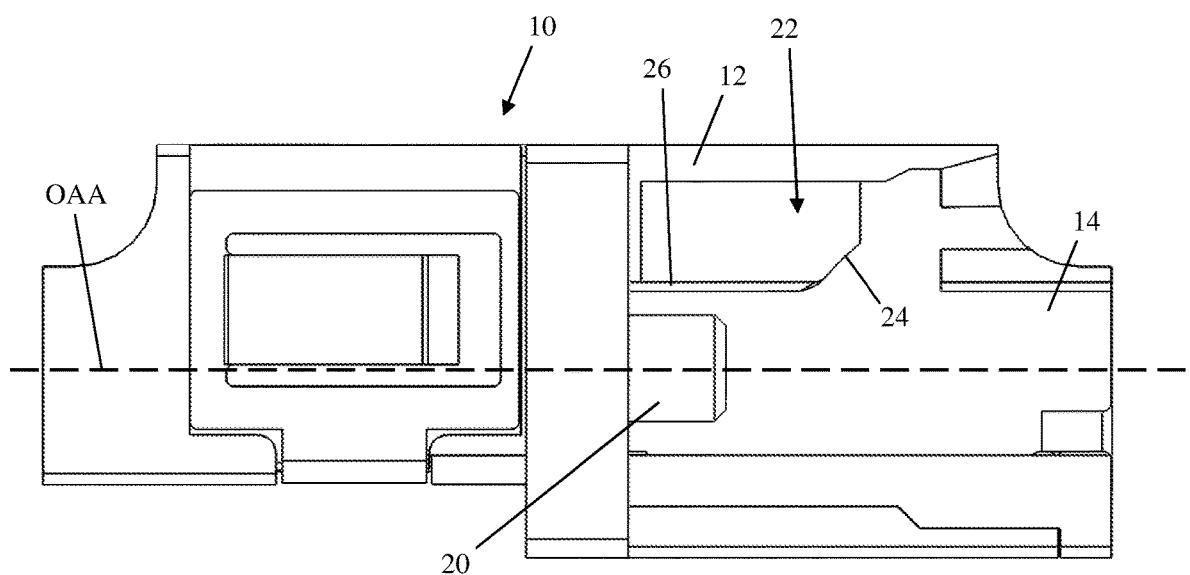
FIG. 6 is a longitudinal section of the fiber optic adapter.

In the illustrated embodiment, the guide 22 also includes a guide channel 26 shaped to conform to the shape of the outer housing 2 (e.g., at least a portion thereof) of the fiber optic connector 1. The guide channel 26 receives and holds the outer housing 2 of the fiber optic connector 1 in alignment with the optical alignment axis OAA within the adapter housing 12. The guide channel 26 is located (e.g., disposed) at one end (e.g., a lower end) of the cam surface 24. Accordingly, the cam surface 24 directs the outer housing 2 of the fiber optic connector 1 into the guide channel 26, which then holds the fiber optic connector in the substantial alignment with the optical alignment axis OAA as the connector is further pushed into the adapter 10. As generally shown in FIGS. 4 and 5, the guide channel 26 has a cross-section including a beveled surface (e.g., a first beveled surface). In the illustrated embodiment, the beveled surface of the guide channel 26 is sized and shaped to correspond to a corresponding beveled surface (e.g., a second beveled surface) on the outer housing 2 of the fiber optic connector 1. The beveled surface of the guide channel 26 generally corresponds to the shape of a corner of the outer housing 2 of the fiber optic connector 1. Therefore, the beveled surface facilitates holding the outer housing 2 so that the axis of the ferrule 4 corresponds to the optical alignment axis OAA.

As indicated above, the guide 22 are configured to hold the outer housing 2 of the fiber optic connector 1 in substantial alignment with the optical alignment axis OAA. Specifically, the cam surface 24 is configured to move or drive the outer housing 2 of the fiber optic connector 1 into substantial alignment with the optical alignment axis OAA and the guide channel 26 is configured to hold the outer housing of the fiber optic connector in substantial alignment with the optical alignment axis as the fiber optic connector is pushed into the adapter 10. In addition, the walls of the adapter housing 12 defining the cavity 18 engage the outer housing 2 of the fiber optic connector 1 to substantially align (e.g., side-to-side) the fiber optic connector with the optical alignment axis OAA. As used herein, the phrase "substantial alignment" and derivations thereof (e.g., "substantially into alignment") preferably means the outer housing 2 of the fiber optic connector 1 (e.g., the insertion axis IA) is aligned with the optical alignment axis OAA within about ±5°, and more preferably about ±3°, and even more preferably about ±1°.

Figure 7:
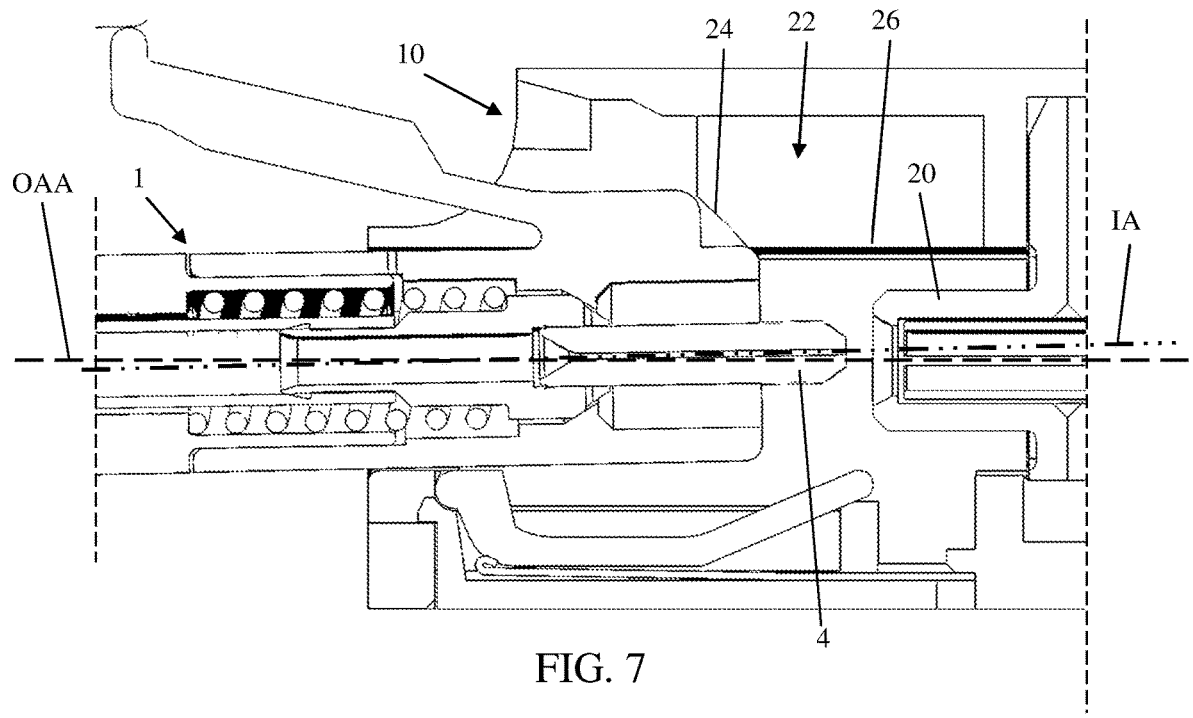
FIG. 7 is a fragmentary, longitudinal section of the fiber optic connector inserted at an upward angle being aligned with the fiber optic adapter.
Figure 8:
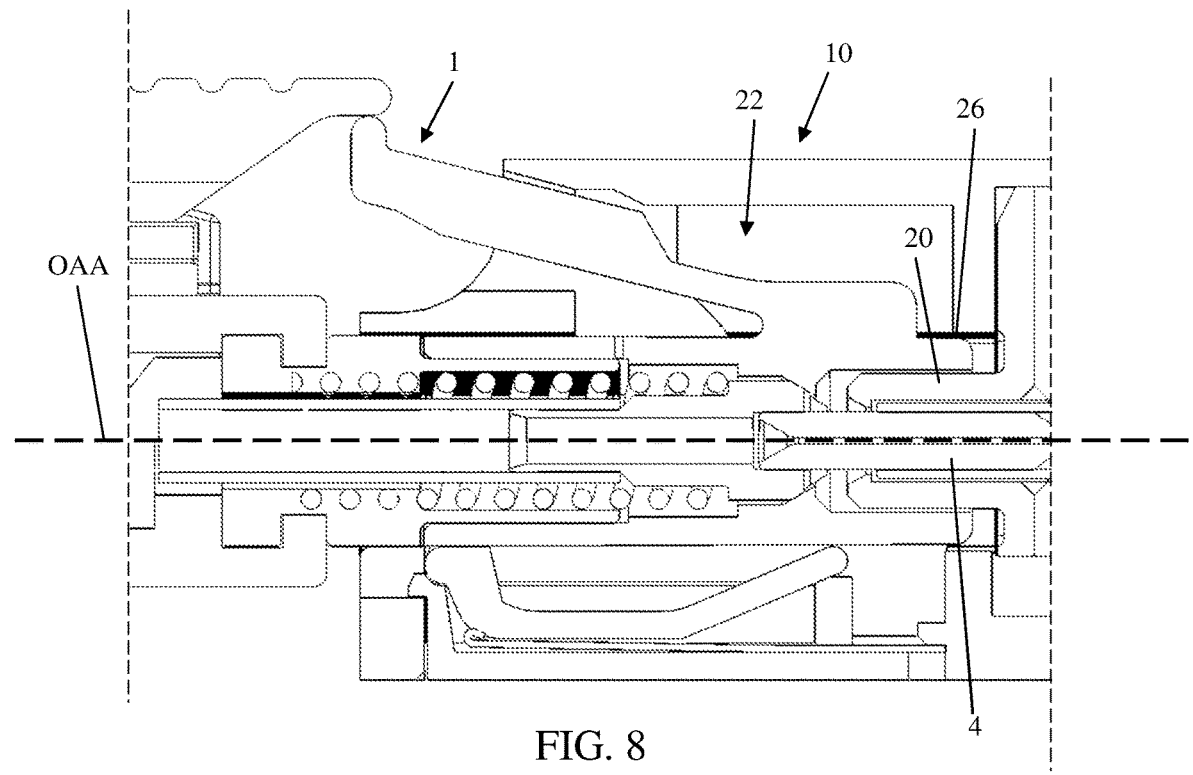
FIG. 8 is a fragmentary, longitudinal section of the fiber optic connector attached to the fiber optic adapter.

In operation and referring to FIGS. 7 and 8, when the fiber optic connector 1 is inserted into the opening 16 along an upwardly extending insertion axis IA, the outer housing 2 of the connector 1 is engaged by the cam surface 24 of the guide 22. As the fiber optic connector 1 is pushed further into the adapter housing 12, the outer housing 2 rides along the cam surface 24, moving the fiber optic connector 1 into alignment with the optical alignment axis OAA. When the outer housing 2 reaches the end of the cam surface 24, the outer housing enters the guide channel 26 which holds the fiber optic connector in substantial alignment with the optical alignment axis OAA as the connector is pushed further into the adapter housing 12. The fiber optic connector 1 continues to move along the guide channel 26 as the fiber optic connector is further pushed into the adapter 10 until the ferrule 4 is inserted into the alignment sleeve 20 and the optical connection is formed (FIG. 8).

Figure 9:
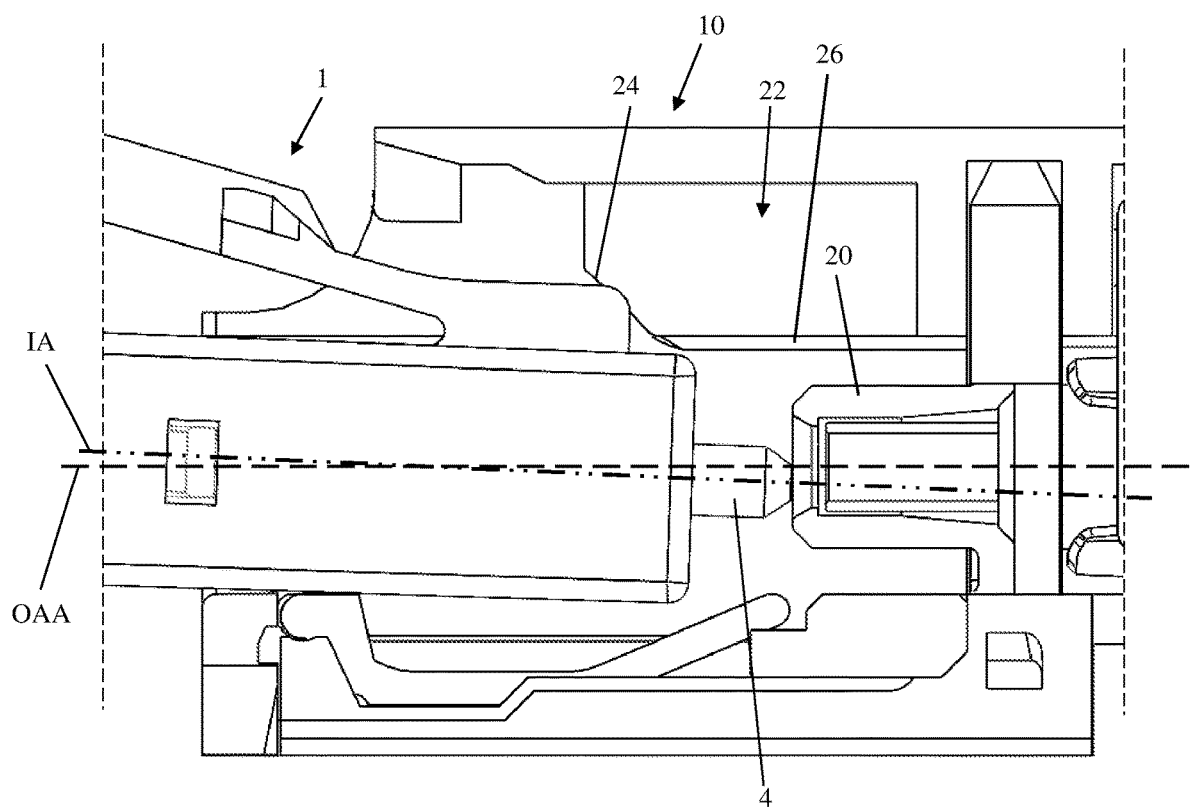
FIG. 9 is a fragmentary, longitudinal section of the fiber optic connector inserted at a downward angle into the fiber optic adapter.
Figure 10:
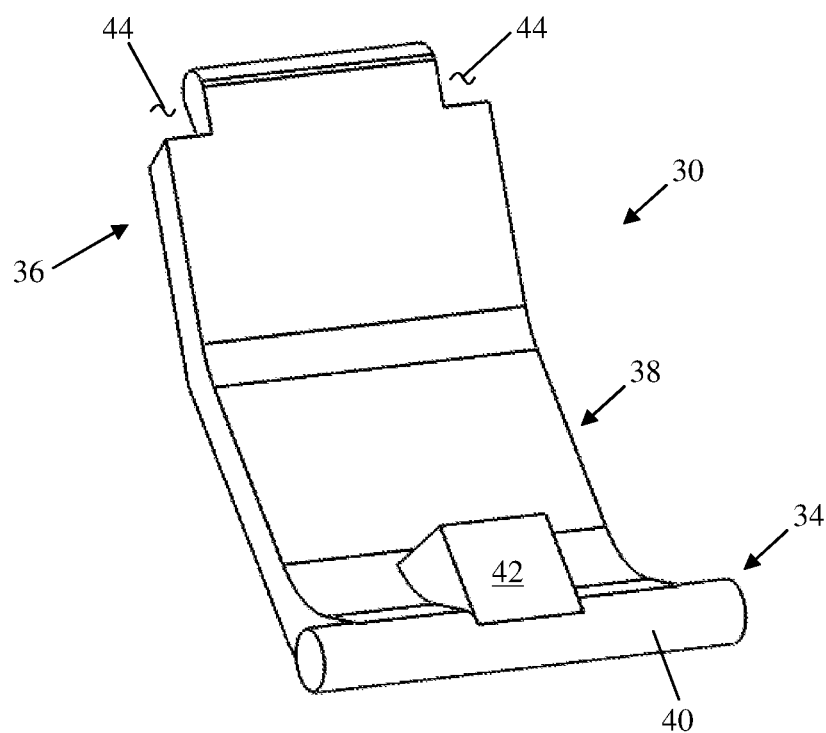
FIG. 10 is a perspective of a dust shutter of the fiber optic adapter.
Figure 11:
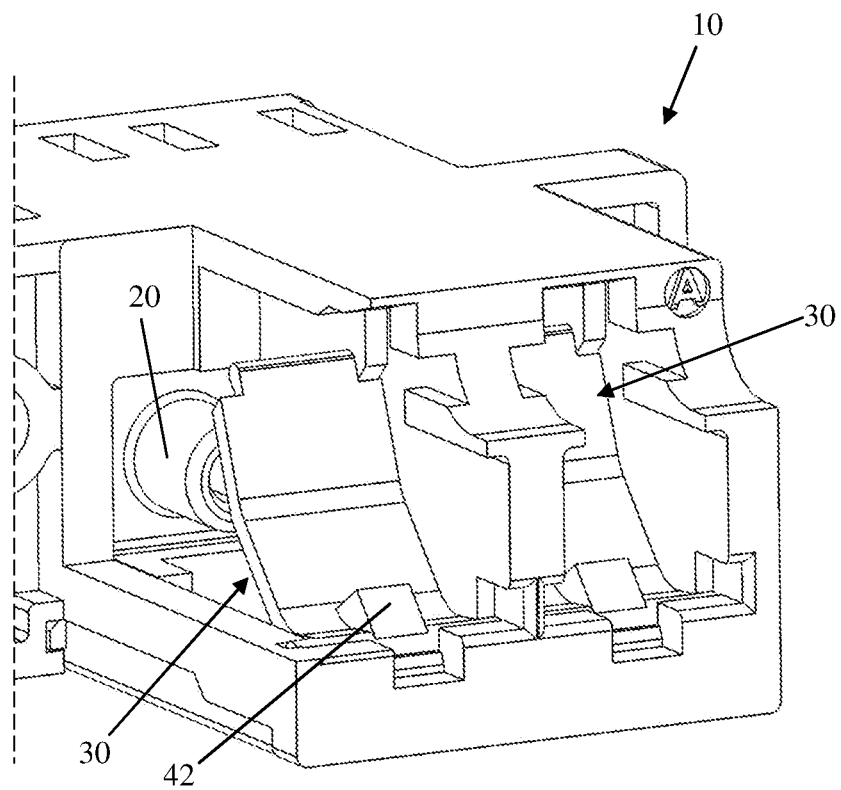
FIG. 11 is a fragmentary perspective of the fiber optic adapter with the dust shutters thereof in an intermediate position, and with portions of the fiber optic adapter cut away to reveal interior details.
Figure 12:
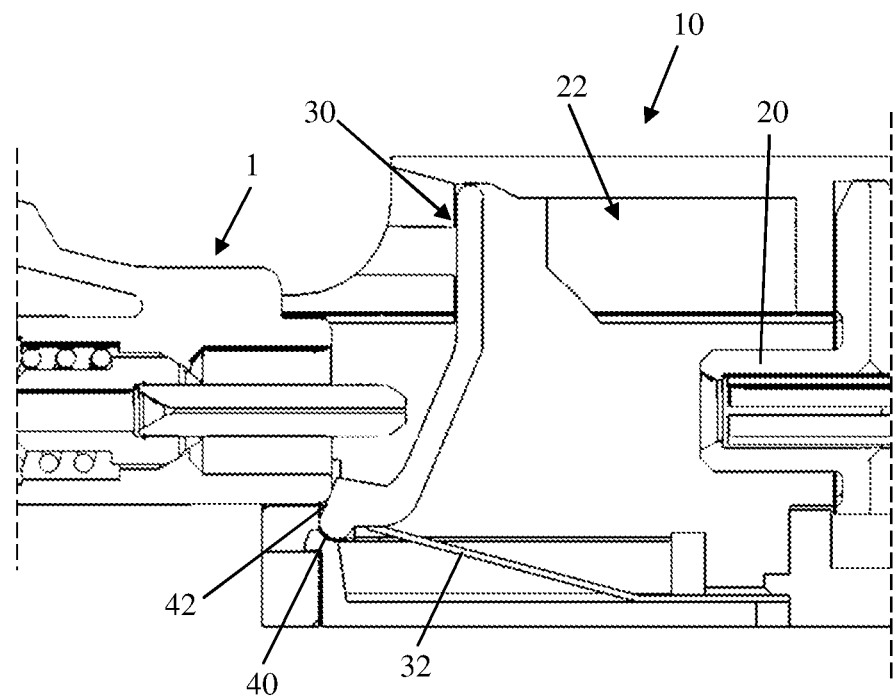
FIG. 12 is a fragmentary, longitudinal section of the fiber optic adapter and fiber optic connector being inserted into the fiber optic adapter, and the dust shutter being in a closed position.
Figure 13:
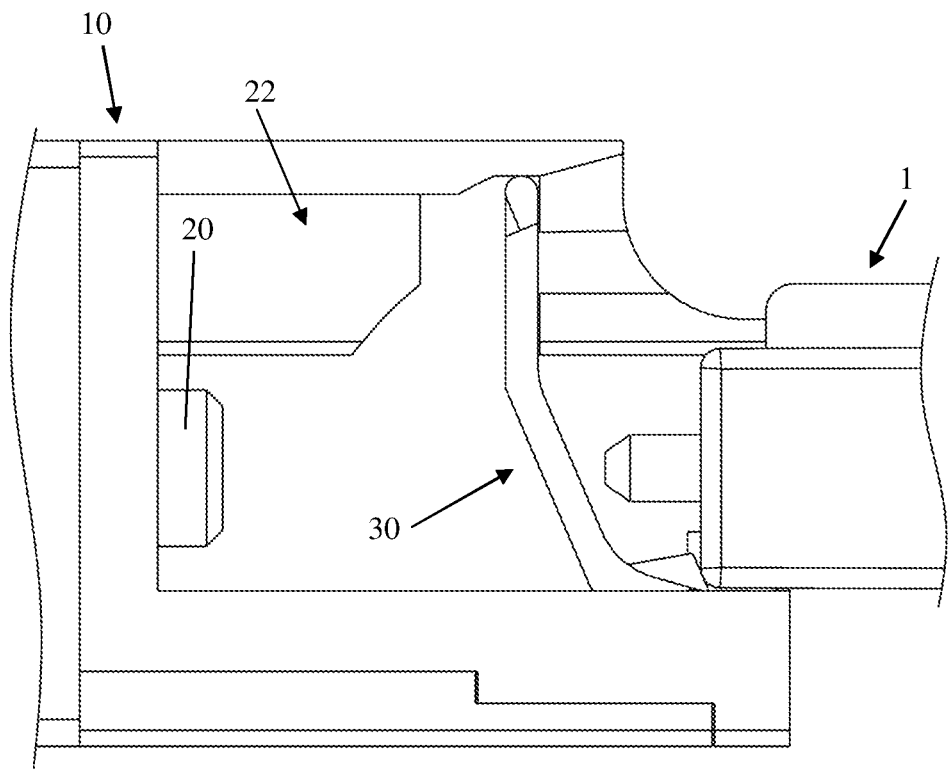
FIG. 13 is an enlarged, fragmentary side view of the fiber optic connector being inserted into the fiber optic adapter, the dust shutter being in a closed position, and with portions of the fiber optic adapter cut away to reveal interior details.
Figure 14:
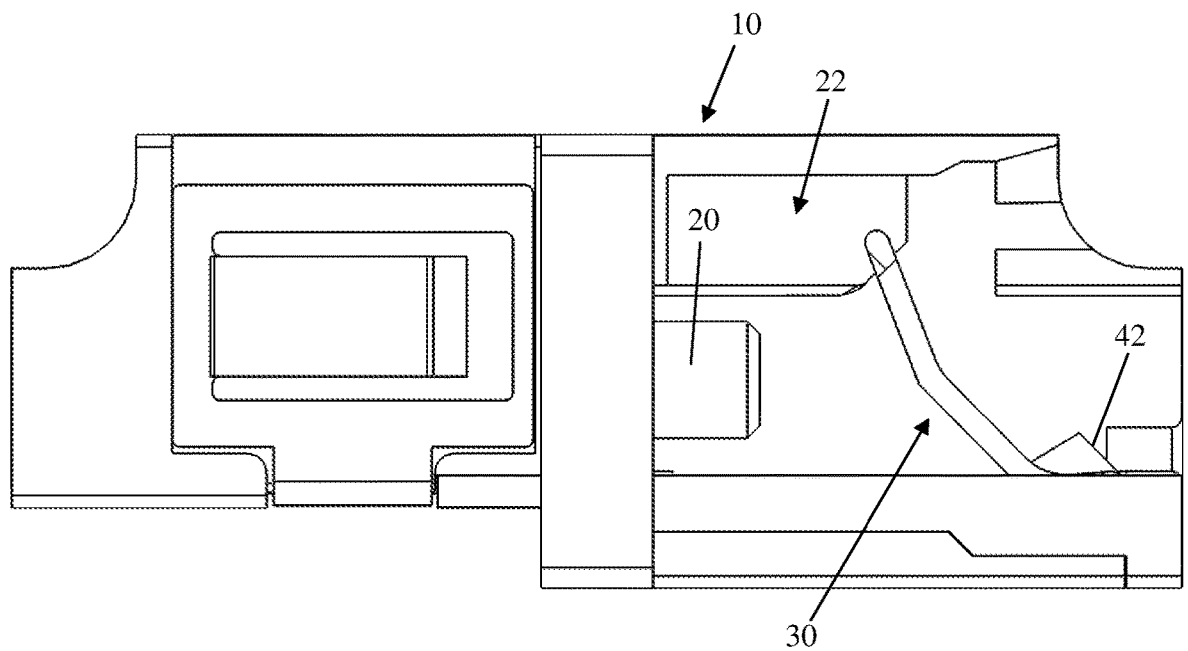
FIG. 14 is a longitudinal section of the fiber optic adapter, with the dust shutter in the intermediate position.
Figure 15:
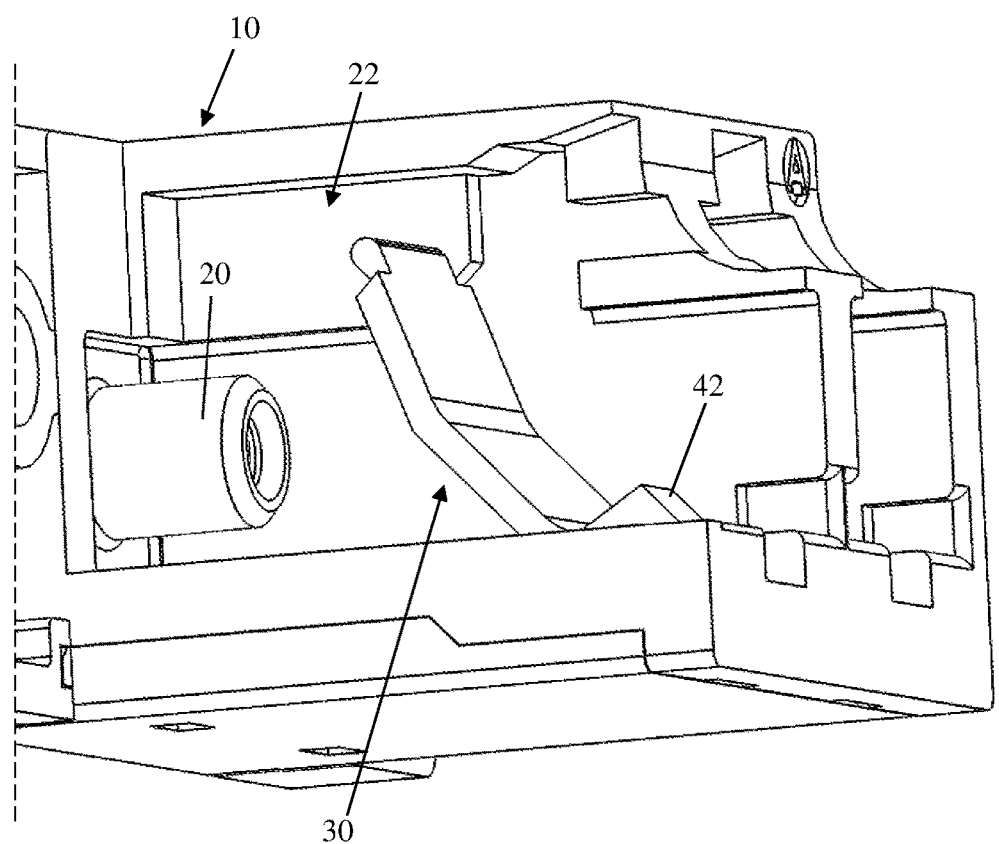
FIG. 15 is another perspective of the fiber optic adapter with the dust shutter in the intermediate position, and with portions of the fiber optic adapter cut away to reveal interior details.
Figure 16:
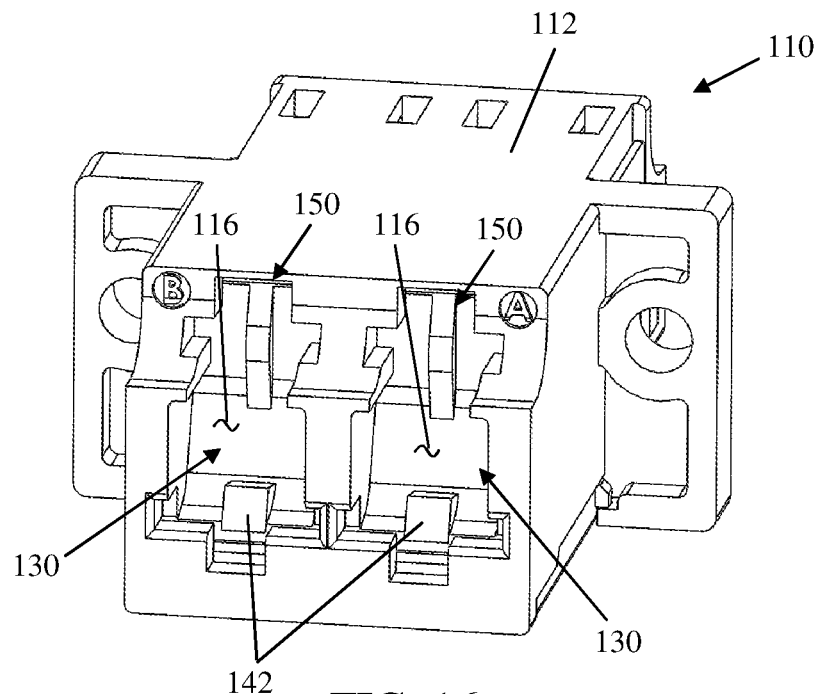
FIG. 16 is a perspective of another embodiment of a fiber optic adapter according to the present disclosure.

Referring to FIGS. 10-15, the fiber optic adapter 10 may also include a dust shutter 30. The dust shutter 30 is movably mounted on the adapter housing 12 for movement between a closed position (FIGS. 12 and 13) and an open position (FIG. 9). FIGS. 11, 14 and 15 show the dust shutter 30 in an intermediate position as the dust shutter moves between the open and closed positions. In the closed position, the dust shutter covers the opening 16 in the adapter housing 12 (e.g., blocks access to the cavity 18 through the opening). This prevents dust and other debris from entering the adapter housing 12 and potentially reducing the quality of the optical connection that is formed between the adapter 10 and the fiber optic connector 1. In the open position, the dust shutter 30 does not cover the opening 16 in the adapter housing 12, does not block and permits access to the cavity 18 (specifically, the alignment sleeve 20) through the opening. In the illustrated embodiment, the dust shutter 20 is rotatably (e.g., pivotably) mounted to the adapter housing 12 and rotates between the closed position and the open position. The adapter 10 includes a spring 32 (FIG. 12) biasing the dust shutter to the closed position. In the illustrated embodiment, the spring 32 comprises a leaf spring mounted in the adapter housing 12 (e.g., the cavity 18), although other configurations of the spring are within the scope of the present disclosure.

In the illustrated embodiment, the dust shutter 30 has a first end portion 34, an opposite second end portion 36 and a middle or intermediate portion 38. The first end portion 34 of the dust shutter 30 includes a rounded segment 40 that engages the outer housing 12 for pivoting on the outer housing from the closed position to the open position upon insertion of the fiber optic connector 1 into the opening 16 of the adapter housing 12. The middle portion 38 of the dust shutter 30 extends from the first end portion 34. The middle portion 38 extends from the first end portion 34 in a direction (e.g., a first direction) into the adapter housing 12 from the opening 16. The second end portion 36 extends from the middle portion 38. The second end portion 36 extends from the middle portion 38 in a direction (e.g., a second direction) that is different from (e.g., at a slight angle to) the middle portion 38. The second end portion 36 is configured to engage the adapter housing 12 (e.g., a wall thereof) to position the dust shutter 30 in the closed position, thereby limiting the rotation of the dust shutter via the spring 32. In the illustrated embodiment, the spring 32 engages the dust shutter 30 adjacent the first end portion 34. In the illustrated embodiment (FIG. 10), the second end portion 36 of the dust shutter 30 includes one or more guide cutouts or recesses 44 (one for each guide 22) arranged to provide a clearance between the guide (specifically, the cam surface 24) and the dust shutter to permit the dust shutter to move past the guide when the dust shutter is moved between the closed and open positions. The adapter housing 12 is formed so that in the closed position of the dust shutter 30, portions of the housing are received in and conform to the cutouts 44 so that the dust shutter effectively blocks the opening 16 in the closed position.

The dust shutter 30 is configured or arranged to engage the outer housing 2 of the fiber optic connector 1 upon insertion of the fiber optic connector into the opening 16 to move the dust shutter from the closed position to the open position against the bias of the spring 32. In the illustrated embodiment, the first end portion 34 of the dust shutter is positioned to engage the outer housing 2 of the fiber optic connector 1 to cause the dust shutter to move from the closed position to the open position, as shown in FIGS. 12 and 13. The first end portion 34 also includes a flat segment 42 positioned to be engaged by the outer housing 2 of the fiber optic connector 1 upon insertion of the fiber optic connector into the opening 16 of the adapter housing 12. The flat segment 42 is adjacent to the rounded segment 40. The middle portion 38 of the dust shutter 30 is shaped so that the middle portion is free of engagement with the fiber optic connector 1 as the dust shutter is moved from the closed position to the open position, as shown in FIG. 9. Specifically, the dust shutter 30 has a generally arcuate shape such that the middle portion 38 is not engaged by the ferrule 4 of the fiber optic connector 1 when the fiber optic connector is inserted into the adapter housing 12 and moves the dust shutter.

Other configurations of the dust shutter are within the scope of the present disclosure.

Referring to FIGS. 16-21, another embodiment of the fiber optic adapter according to the present disclosure is generally indicated by reference numeral 110. Fiber optic adapter 110 is generally analogous to fiber optic adapter 10 and, thus, for ease of comprehension, where identical, similar or analogous parts are used, reference numerals "100" units higher are employed. Accordingly, unless clearly stated or indicated otherwise, the above descriptions regarding fiber optic adapter 10 also apply to fiber optic adapter 110.

In this embodiment, the adapter 110 includes a dust shutter 130 that includes a connector guide 150 (e.g., a second guide). The connector guide 150 is configured to align the fiber optic connector 1 with the optical alignment axis OAA of the adapter housing 112 as the fiber optic connector is inserted into the adapter 110. Specifically, the connector guide 150 is configured to align the ferrule 4 of the fiber optic connector 1 with the alignment sleeve 120 of the adapter 110. In addition, the guide 150 is configured to hold the fiber optic connector 1 in alignment with the optical alignment axis OAA.

Figure 20:
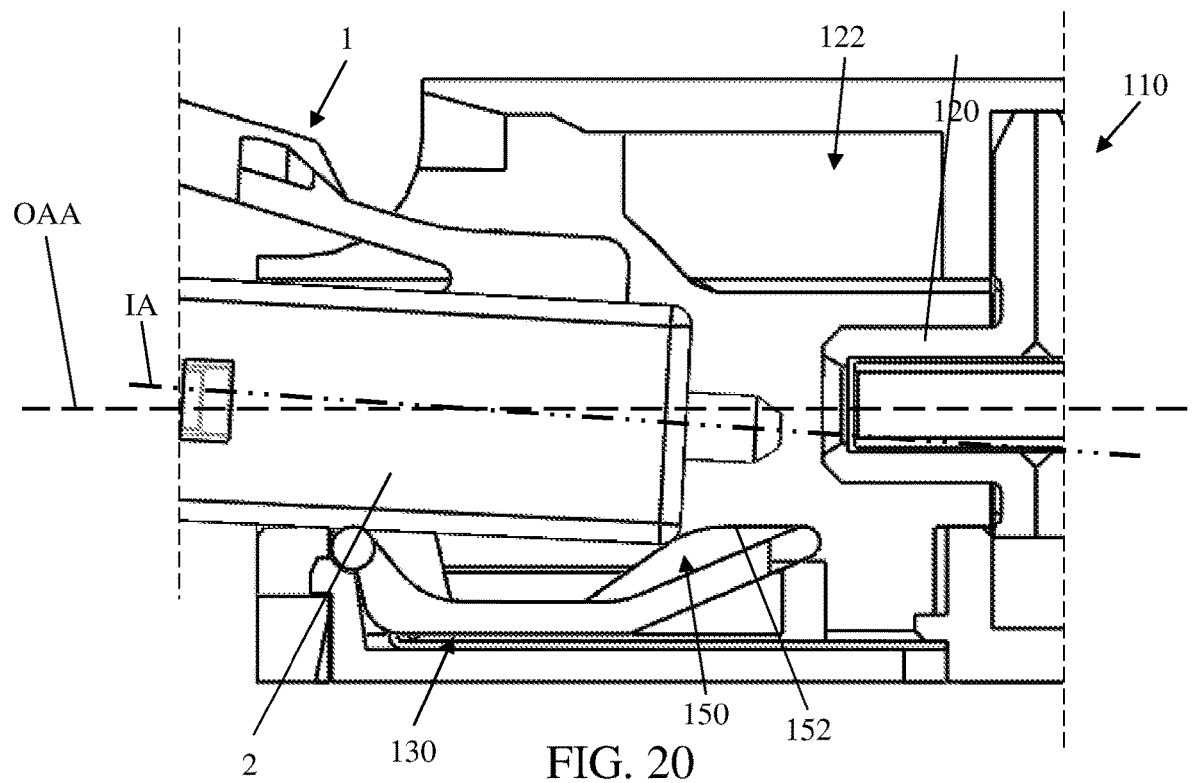
FIG. 20 is an enlarged, fragmentary longitudinal section of the fiber optic adapter of FIG. 16, showing insertion of the fiber optic connector at a downward angle into the fiber optic adapter.

The connector guide 150 is generally disposed on the second end portion 136 of the dust shutter 130. The connector guide 150 is arranged such that when the fiber optic connector 1 is inserted into the adapter 10, the fiber optic connector may engage the connector guide if the fiber optic connector is misaligned with the optical alignment axis OAA (FIG. 20). The connector guide 150 comprises a guide surface 152. When the dust shutter 130 is in the open position (FIGS. 20 and 21), the guide surface 152 generally faces upward or generally toward the guides 122. In the illustrated embodiment, the guide surface 152 includes a proximal segment 152A, an intermediate segment 152B and a distal segment 152C. The proximal and distal segments 152A, 152C are generally planar, but are at different angles relative to each other. The intermediate segment 152B is arcuate. The intermediate segment 152B interconnects and provides a smooth transition between the proximal and distal segments 152A, 152C. The distal segment 152C is configured to align and hold the fiber optic connector 1 in substantial alignment with the optical alignment axis OAA. Any one of the proximal segment 152A, intermediate segment 152B and/or distal segment 152C may engage the fiber optic connector 1, with the proximal and intermediate segments moving the fiber optic connector toward the distal segment, and the alignment provided and held thereby.

The guide surface 152 is configured and arranged for engaging the fiber optic connector 1 (e.g., the outer housing 2) as the connector is inserted into and pushed farther into the adapter 110. Specifically, the guide surface 152 is configured and arranged to engage the outer housing 2 of the fiber optic connector 1 inserted into the opening 116 (and cavity 118) along an insertion axis IA (e.g., a second insertion axis) that is divergent from the optical alignment axis OAA to drive the fiber optic connector substantially into alignment with the optical alignment axis as the fiber optic connector traverses the guide surface upon being pushed farther into the adapter housing. In particular, the guide surface 152 is arranged to drive the fiber optic connector 1 substantially into alignment with the optical alignment axis OAA when the dust shutter 130 is in the open position. The guide surface 152 is positioned and arranged to engage the outer housing 2 of the fiber optic connector 1 when the fiber optic connector is inserted along a downwardly extending insertion axis IA (FIG. 20) (e.g., when the connector is inserted along or at a downward angle) to drive the fiber optic connector upward (e.g., push or rotate the front end of the connector upward) substantially into alignment with the optical alignment axis OAA as the fiber optic connector traverse the guide surface upon being pushed farther into the adapter housing 112. As the guide surface 152 pushes the front or leading end of the fiber optic connector 1 upward, the connector may rotate about a portion of the adapter housing 112 adjacent the opening 116 to bring the insertion axis IA (e.g., the direction of movement) into substantial alignment with the optical alignment axis OAA.

As indicated above, the connector guide 150 on the dust shutter 130 is configured to hold the outer housing 2 of the fiber optic connector 1 in substantial alignment with the optical alignment axis OAA. Specifically, the guide surface 152 (e.g., the proximal segment 152A and/or intermediate segment 152B) is configured to move or drive the outer housing 2 of the fiber optic connector 1 into substantial alignment with the optical alignment axis OAA and the guide surface (e.g., the distal segment 152C) is configured to hold the outer housing of the fiber optic connector in substantial alignment with the optical alignment axis as the fiber optic connector is pushed into the adapter 10. In addition, the walls of the adapter housing 112 defining the cavity 118 engage the outer housing 2 of the fiber optic connector 1 to substantially align (e.g., side-to-side) the fiber optic connector with the optical alignment axis OAA.

Figure 19:
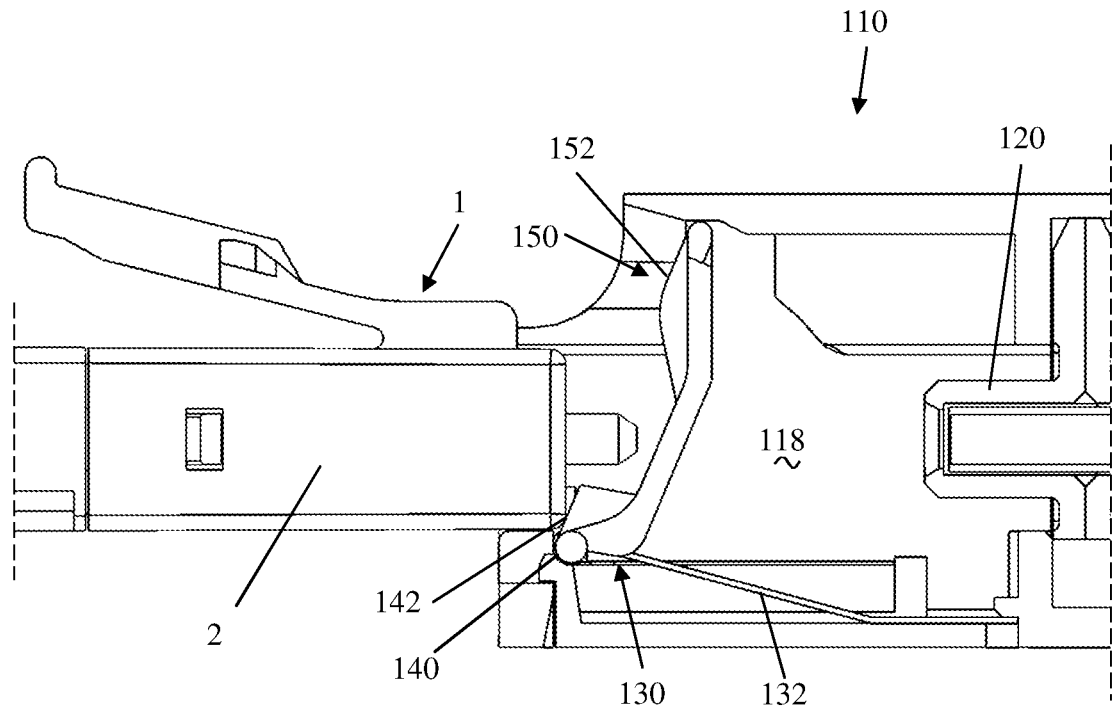
FIG. 19 is a fragmentary, longitudinal section of the fiber optic adapter of FIG. 16, showing a connector just as it enters the adapter.
Figure 21:
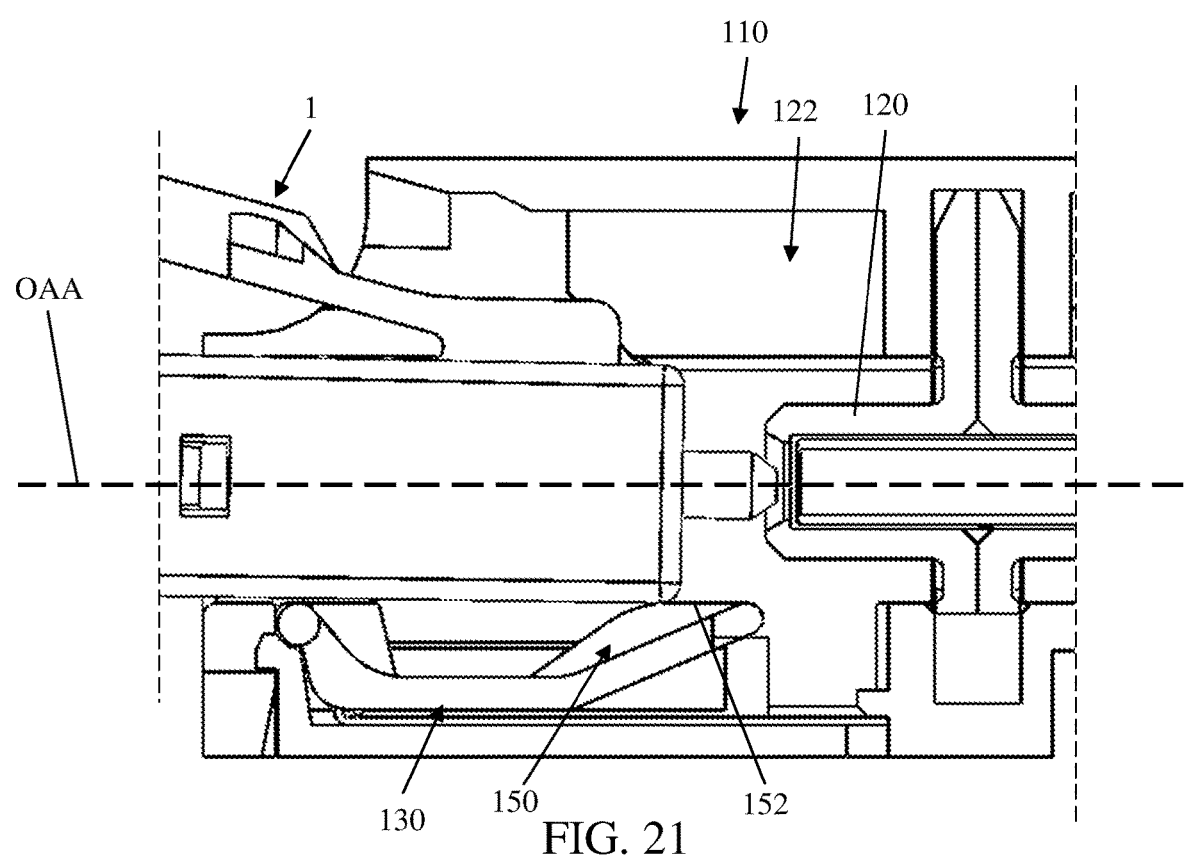
FIG. 21 is a fragmentary, longitudinal section of the fiber optic adapter of FIG. 16, showing the fiber optic connector aligned with the fiber optic adapter.

In operation and referring to FIGS. 19-21, when the fiber optic connector 1 is initially inserted into the opening 116, the fiber optic connector engages the flat segment 142 and moves the dust shutter 130 toward the open position. When the dust shutter 130 is inserted along a downwardly extending insertion axis IA, the outer housing 2 of the connector 1 is eventually engaged by the guide surface 152 of the connection guide 150. As the fiber optic connector 1 is pushed further into the adapter housing 112, the outer housing 2 rides along the guide surface 152, moving the fiber optic connector 1 into alignment with the optical alignment axis OAA. For example, fiber optic connector 1 may engage and ride along the proximal segment 152A and the intermediate segment 152B and then along the distal segment 152C which aligns and holds the fiber optic connector in substantial alignment with the optical alignment axis OAA as the connector is pushed further into the adapter housing 112. The fiber optic connector 1 continues to move along the guide surface 150 (e.g., distal segment 152C) as the fiber optic connector is further pushed into the adapter 110 until the ferrule 4 is inserted into the alignment sleeve 120 and the optical connection is formed.

As is now apparent, the one or more guides 122 of the adapter 110 engage the fiber optic connector 1 when the fiber optic connector is inserted along an upwardly extending insertion axis IA (FIG. 7) and the connector guide 150 on the dust shutter 130 engages the fiber optic connector when the fiber optic connector is inserted along a downwardly extending insertion axis (FIG. 20). Thus, regardless of whether the fiber optic connector 1 is inserted along the upwardly and/or downwardly insertion axis IA, the one or more guides 122 and the connector guide 150 will drive the fiber optic connector into substantial alignment with the optical alignment axis OAA.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors therein to align and connect optical fibers end-to-end. As described herein, the connectors and adapters may be considered multi-fiber connectors and multi-fiber adapters.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic adapter for mating a fiber optic connector having an outer housing with another fiber optic device, the fiber optic adapter comprising:
    an adapter housing including a wall and an opening configured to accept the fiber optic connector outer housing;
    an optical alignment axis extending through the adapter housing and passing through the opening of the adapter housing; and
    a guide on the wall of the outer housing, the guide comprising a cam surface located inward of the adapter housing opening, facing toward the adapter housing opening and extending along an axis that is transverse to the optical alignment axis, the cam surface being configured and arranged in the adapter housing for engaging the fiber optic connector outer housing inserted into the adapter housing opening along an insertion axis that is divergent from the optical alignment axis to drive the fiber optic connector substantially into alignment with the optical alignment axis as the fiber optic connector traverses the cam surface upon being pushed farther into the adapter housing; and
    a dust shutter mounted on the adapter housing for movement between a closed position in which the dust shutter covers the opening in the adapter housing and an open position in which the dust shutter does not cover the opening,
    wherein the dust shutter includes a guide surface positioned to engage the fiber optic connector outer housing upon insertion of the fiber optic connector into the adapter housing opening along an insertion axis that is divergent from the optical alignment axis to drive the fiber optic connector substantially into alignment with the optical alignment axis as the fiber optic connector traverses the guide surface upon being pushed father into the adapter housing.

2. The fiber optic adapter according to claim 1, wherein the guide further comprises a guide channel shaped to conform to the shape of the outer housing of the fiber optic connector for holding the outer housing in alignment with the optical alignment axis within the adapter housing.

3. The fiber optic adapter according to claim 2, wherein the guide channel is located at one end of the cam surface.

4. The fiber optic adapter according to claim 2, wherein the guide channel has a cross section including a beveled surface.

5. The fiber optic adapter according to claim 2, wherein the cam surface constitutes a first cam surface, and the guide channel constitutes a first guide channel, the fiber optic adapter further comprising a second cam surface and a second guide channel.

6. The fiber optic adapter according to claim 5, wherein the second cam surface and second guide channel are located for engaging a different portion of the fiber optic connector outer housing than the first cam surface and first guide channel.

7. The fiber optic adapter according to claim 2, wherein the guide channel holds the fiber optic connector outer housing in alignment with the optical alignment axis within about $+1°$.

8. The fiber optic adapter according to claim 1, further comprising an alignment sleeve in an interior of the adapter housing, the alignment sleeve being co-axial with the optical alignment axis.

9. The fiber optic adapter according to claim 1, wherein the dust shutter is configured to engage the outer housing of the fiber optic connector upon insertion of the fiber optic connector into the opening to move the dust shutter from the closed position to the open position against the bias of the spring.

10. The fiber optic adapter according to claim 9, wherein the dust shutter has a first end portion, an opposite second end portion and a middle portion, the first end portion of the dust shutter being positioned to engage the fiber optic connector outer housing to cause the dust shutter to move from the closed position to the open position, the middle portion of the dust shutter being shaped so that the middle portion is free of engagement with the fiber optic connector as the dust shutter is moved from the closed position to the open position.

11. The fiber optic adapter according to claim 10, wherein the first end portion of the dust shutter includes a rounded segment engaging the outer housing for pivoting on the dust shutter from the closed position to the open position upon insertion of the fiber optic connector into the adapter housing opening.

12. The fiber optic adapter according to claim 11, wherein the first end portion further includes a flat segment adjacent to the rounded segment, the flat segment being positioned to engage the fiber optic connector outer housing upon insertion of the fiber optic connector into the adapter housing opening.

13. The fiber optic adapter according to claim 10, wherein the middle portion of the dust shutter extends from the first end portion in a direction into the adapter housing from the opening.

14. The fiber optic adapter according to claim 9, wherein the spring comprises a leaf spring mounted in the adapter housing.

15. The fiber optic adapter according to claim 14, wherein the leaf spring engages the dust shutter adjacent the first end portion thereof.

16. The fiber optic adapter according to claim 1, wherein the guide surface is arranged to drive the fiber optic connector substantially into alignment with the optical alignment axis when the dust shutter is in the open position.

17. The fiber optic adapter according to claim 10, wherein the dust shutter includes a guide cutout arranged to provide a clearance between the guide and the dust shutter to permit the dust shutter to move past the guide when the dust shutter is moved between the closed and open positions.

18. A fiber optic adapter for mating a fiber optic connector, comprising:
 an adapter housing including at least one opening configured to accept the fiber optic connector; and
 a shutter member on the adapter housing and configured to move between a closed position in which the shutter member closes the opening and an open position in which the shutter member does not cover the opening,
 wherein the shutter member includes a guide surface configured to engage the fiber optic connector upon insertion of the fiber optic connector into the adapter housing opening along an insertion axis that is divergent from the optical alignment axis, and guide the fiber optic connector to move further into the adapter housing.

19. The fiber optic adapter according to claim 18, wherein the shutter member comprises a guide, and the guide surface is provided on the guide.

20. The fiber optic adapter according to claim 19, wherein the guide is arranged at a position along a central axis of the shutter member.

\* \* \* \* \*